(12) United States Patent
Aibara et al.

(10) Patent No.: US 6,456,457 B1
(45) Date of Patent: Sep. 24, 2002

(54) INFORMATION RECORDING/REPRODUCING DEVICE

(75) Inventors: Syusei Aibara; Toshiharu Tsubouchi, both of Ehime (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/743,450
(22) PCT Filed: May 10, 2000
(86) PCT No.: PCT/JP00/02966
§ 371 (c)(1),
(2), (4) Date: Feb. 28, 2001
(87) PCT Pub. No.: WO00/68944
PCT Pub. Date: Nov. 16, 2000

(30) Foreign Application Priority Data

May 10, 1999 (JP) .............................. 11-129091

(51) Int. Cl.$^7$ .............................................. G11B 17/02
(52) U.S. Cl. .................................................. 360/99.06
(58) Field of Search .......................... 360/96.5, 96.6, 360/99.02, 99.03, 99.06, 99.07, 69, 71, 60

(56) References Cited

U.S. PATENT DOCUMENTS

| | | | | |
|---|---|---|---|---|
| 4,829,393 A | * | 5/1989 | Shimizu et al. ............... | 360/71 |
| 4,984,111 A | * | 1/1991 | Rudi ........................... | 360/71 |
| 5,070,418 A | * | 12/1991 | Takahashi .................... | 360/71 |
| 5,119,252 A | * | 6/1992 | Kamata et al. ............... | 360/71 |
| 5,875,063 A | * | 2/1999 | Corrington et al. ........... | 360/71 |
| 6,067,201 A | * | 5/2000 | Shimizu et al. ............... | 360/60 |

FOREIGN PATENT DOCUMENTS

| | | |
|---|---|---|
| JP | 3-106558 | 11/1991 |
| JP | 3-268267 | 11/1991 |
| JP | 4-12153 | 1/1992 |
| JP | 7-23264 | 1/1995 |

OTHER PUBLICATIONS

Microfilm of the specification and drawings annexed to the request of Japanese Utility Model Application No. 48681/1990 (Laid–open No. 12153/1992) (Sony Corporation), Jan. 31, 1992.
Microfilm of the specification and drawings annexed to the request of Japanese Utility Model Application No. 16320/1990 (Laid–open No. 106558/1991) (Ricoh Company, Ltd.), Nov. 5, 1991.

* cited by examiner

Primary Examiner—Robert S. Tupper
(74) Attorney, Agent, or Firm—Wenderoth, Lind & Ponack, L.L.P.

(57) ABSTRACT

An information recording and reproduction apparatus has an eject slider 9 which is moved by the operation from the outside. An eject plate 2 as a mechanical driving means for constituting a loading mechanism is engaged with an eject lock lever 12, through which a driving force to the eject slider 9 is transmitted to the eject plate 2.

During when information is being recorded into a recording medium 4, by that an eject latch magnet 15 is energized, an absorption plate 14 of the eject lock lever 12 is absorbed and the eject lock lever 12 is inclined, and therefore, a driving force which is applied to the eject slider 9 should not be transmitted to the eject lock lever 12, thereby resulting in preventing a driving force from being transmitted to the eject plate 2.

1 Claim, 5 Drawing Sheets

INFORMATION RECORDING/REPRODUCING DEVICE

TECHNICAL FIELD

The present invention relates to an information recording and reproduction apparatus which records an information signal into an information recording medium such as a magnetic disk, an optical disk, and a magnet-optical disk, and reproduces the information signal recorded into the information recording medium of this kind, and more particularly, to a mechanism in the apparatus for preventing exhaustion of the information recording medium during when the information signal is being recorded into the information recording medium.

BACKGROUND ART

As a conventional method for exhausting a recording medium which is mounted in the information recording and reproduction apparatus (hereinafter, simply referred to as "recording apparatus") for recording an information signal into an information recording medium (hereinafter, simply referred to as "recording medium") such as a floppy disk or a CD-R, and reproducing the information signal recorded into the recording medium, there is a system in which an eject button and a loading mechanism which is in a relative movement with the eject button for exhausting the recording medium to the outside are provided in the recording apparatus, and the driving apparatus for driving the loading mechanism is operated by pressing the eject button. This driving apparatus is divided roughly into mechanical ones and electric ones.

At first, a conventional recording apparatus X will be described briefly with reference to FIG. 3 and FIG. 4. A magnetic disk recording and reproduction apparatus is described as the conventional recording apparatus X.

Initially, the loading mechanism for the recording medium will be described.

The loading mechanism is constituted mainly by an eject plate 2 and an elevator 3, which function as operated moving parts.

The eject plate 2 is regulated for its movement in rightward-to-leftward direction and upward-to-downward direction in the apparatus by convex parts 1a, 1b, 1c and 1d of a chassis 1 so as only to move in backward-to-forward direction.

While the elevator 3 holds a recording medium 4, the elevator 3 is located inside the eject plate 2 and is regulated for its movement in rightward-to-leftward direction. Further, a convex part 3a of the elevator 3 is regulated for its movement in backward-to-forward direction by a groove part 1e of the chassis 1, thereby the elevator 3 can only move in upward-to-downward direction.

Next, the internal mechanism in a case where the recording medium 4 has been inserted in the recording apparatus X so as to enable recording and reproduction will be described. In this case, the eject plate 2 is pushed forward in the recording apparatus X by eject springs 5a and 5b which are mounted on the chassis 1.

The elevator 3 is pushed downward when the eject plate 2 is subjected to a force toward forward because the convex parts 3a and 3b of the elevator 3 are inserted into sloped groove parts 2a and 2b of the eject plate 2, respectively.

When the recording medium 4 in the elevator 3 is inserted into the recording apparatus X, by that the upward-to-downward direction and rightward-to-leftward direction movements thereof are regulated by the convex parts 1a and 1b of the chassis 1 and the upward-to-downward direction movement thereof is regulated by the convex parts 1c and 1d of the chassis 1, and further that the elevator 3 is pushed downward, the recording medium 4 is fixed firmly without a jounce in the recording apparatus X.

A case where the recording medium 4 is exhausted from the recording apparatus X will be described.

At first, when the mechanical driving means for mechanically driving the loading mechanism is one which utilizes an electrical apparatus, by that the eject motor 6 is operated to rotate the convex part 6a thereof and the convex part 2c of the eject plate 2 is pulled against the eject springs 5a and 5b by the convex part 6a, the eject plate 2 is moved toward backward of the recording apparatus X. In this case, the convex part 2d of the eject plate 2 in FIG. 3 functions as an emergency manual exhaustion means which operates when the eject motor 6 comes into a non-operative state by any cause.

When the mechanical driving means for mechanically driving the loading mechanism is one which utilizes the mechanical apparatus, the. eject plate 2 is moved toward backward of the recording apparatus X by pushing the convex part 2d of the eject plate 2. In either case, the elevator 3 is moved upward by that the eject plate 2 is moved, thereby resulting in that the recording medium 4 is released from the regulations by the convex parts 1a, 1b, 1c and 1d, and being subjected to a force toward downward applied by the elevator 3, and therefore the recording medium 4 is exhausted to the outside of the recording apparatus X. In this case, the convex part 2c of the eject plate 2 and the eject motor 6 shown in FIG. 3 are not required.

The operation of the loading mechanism for exhausting the recording medium 4 which is inserted into the recording apparatus X to the outside will be described with reference to FIG. 5. At first, because a latch 7 is subjected to a force to rotate in a right turn direction applied by a latch spring 8, a top part 7a of the latch 7 is pushed toward a screw part 2e of the eject plate 2. Then, by that the eject plate 2 is moved toward backward of the recording apparatus X, the screw part 2e of the eject plate 2 is moved from the top part 7a of the latch 7 sliding along a corner part 7b of the latch 7, and when it reaches the corner part 7b, the latch 7 turns in a right turn direction and is dropped in a concave part 7c to be stopped. At this point, the convex part 7d of the latch 7 is moved forward by the rotation of the latch 7 in a right turn direction, and is collided with the recording medium 4 thereby to push the same. Thus, the exhaustion of the recording medium 4 is carried out.

A brief description will be given of the exhaustion operation for exhausting the recording medium in the recording apparatus to the outside when the driving apparatus for driving the above-mentioned loading mechanism is an electric one. When the eject button is pressed while an information signal is being recorded into an information recording medium by the operation of the recording apparatus, the recording apparatus is described to ignore that the eject button is pressed, or to wait until the recording operation should be concluded and to exhaust the recording medium after confirming the conclusion of the recording operation. In this way, the information on the recording medium is prevented from being destroyed. Further, when the power of the recording apparatus is turned off in a state where the recording medium is inserted in the recording apparatus, the exhaustion of the recording medium is made impossible. In order to prepare for such case in emergency, there is generally provided with an emergency manual exhaustion means for forcibly exhausting the recording medium to the outside of the recording apparatus employing a manual exhaustion tool.

However, in a case where the driving apparatus for driving the loading mechanism is a mechanical one, if the eject button is pressed while the information signal is being recorded into a recording medium by the operation of the recording apparatus, the recording medium is forcibly exhausted during the recording, and thus it is liable that the information cannot be read out because it is recorded only halfway, or that the recording medium itself is destroyed because it is exhausted rotating in the recording apparatus. The same applies to a case where the recording medium is exhausted forcibly by employing the above-mentioned emergency manual exhaustion means.

To avoid such a situation, the conventional recording apparatus is provided with an eject lock means for locking the mechanical exhaustion driving means lest it should operate, and a means for preventing the emergency manual exhaustion means from operating during the operation of the recording apparatus, in order to prevent a wrong exhaustion of the recording medium while the recording apparatus is operating.

However, in the conventional recording apparatus which is provided with such means, when it is not noticed that the recording medium is prevented from being exhausted, it is possible that a strong force is applied to the emergency manual exhaustion means or to the eject lock means from the outside when the recording medium is attempted to be exhausted forcibly.

When it comes into such a situation, it is possible that the means for preventing the recording medium from being exhausted should be deformed or destroyed, and in the worst case, that the recording apparatus itself should be destroyed or that it should not operate properly. Particularly, an apparatus which is thinned and downsized is to be constituted with weaker mechanical parts, thereby the structural parts inside the apparatus are more likely to be deformed or destroyed than usual.

The present invention is made to solve the above-described problems and has for its object to provide an information recording and reproduction apparatus in which, while an information signal is being recorded into the recording medium, the exhaustion of the recording medium by the operation from the outside can be prevented without an excessive force being applied to the recording apparatus as well as without occurring deformation or destruction of the structural parts inside the recording apparatus even when the recording apparatus is operated from the outside.

DISCLOSURE OF INVENTION

An information recording and reproduction apparatus according to the present invention (claim 1) which performs recording of information into a recording medium or reproduction of the information recorded in the recording medium, where the recording medium can be inserted/ejected, comprises at least; a loading mechanism for exhausting the recording medium to the outside of the information recording and reproduction apparatus; a operated moving part which is moved by the operation from the outside of the information recording and reproduction apparatus; a mechanical driving means for mechanically driving the loading mechanism; and an exhaustion preventing means for preventing the loading mechanism from being driven mechanically during when the information recording and reproduction apparatus is recording the information into the recording medium, and in the information recording and reproduction apparatus, a driving force of the mechanical driving means is associated with a driving force of the being subjected to operation and moving part, and the exhaustion preventing means is operated when the association is cut off.

According to the information recording and reproduction apparatus constituted as described above, the operated moving part, which is moved by the operation from the outside of the apparatus, is provided and is to move to the same extent as in case of exhausting the recording medium even in case of preventing the exhaustion of the recording medium, and moreover, a driving force is prevented from being transmitted to the mechanical driving means so that the loading mechanism is prevented from being driven mechanically. Therefore, an operator can confirm that the medium shall not be exhausted even if he operates, thereby preventing the operator from performing any more operation. Thus, an excessive force shall not be applied to the apparatus, thereby the structural parts inside the apparatus are prevented from being deformed or destroyed, and further, the exhaustion of the recording medium by the operation from the outside can be prevented.

BEST MODE TO EXECUTE THE INVENTION

Hereinafter, an embodiment of the present invention will be described with reference to drawings. However, the embodiment shown here is merely an example and not necessarily restricted to this one.

Embodiment 1

Hereinafter, an example of a recording apparatus A according to the present invention, which has a means for preventing compulsory exhaustion of the recording medium 4 during the recording operation securing a stroke of the external operation without locking an exhaustion mechanism, will be described as a first embodiment with reference to the drawings.

Figure 1:
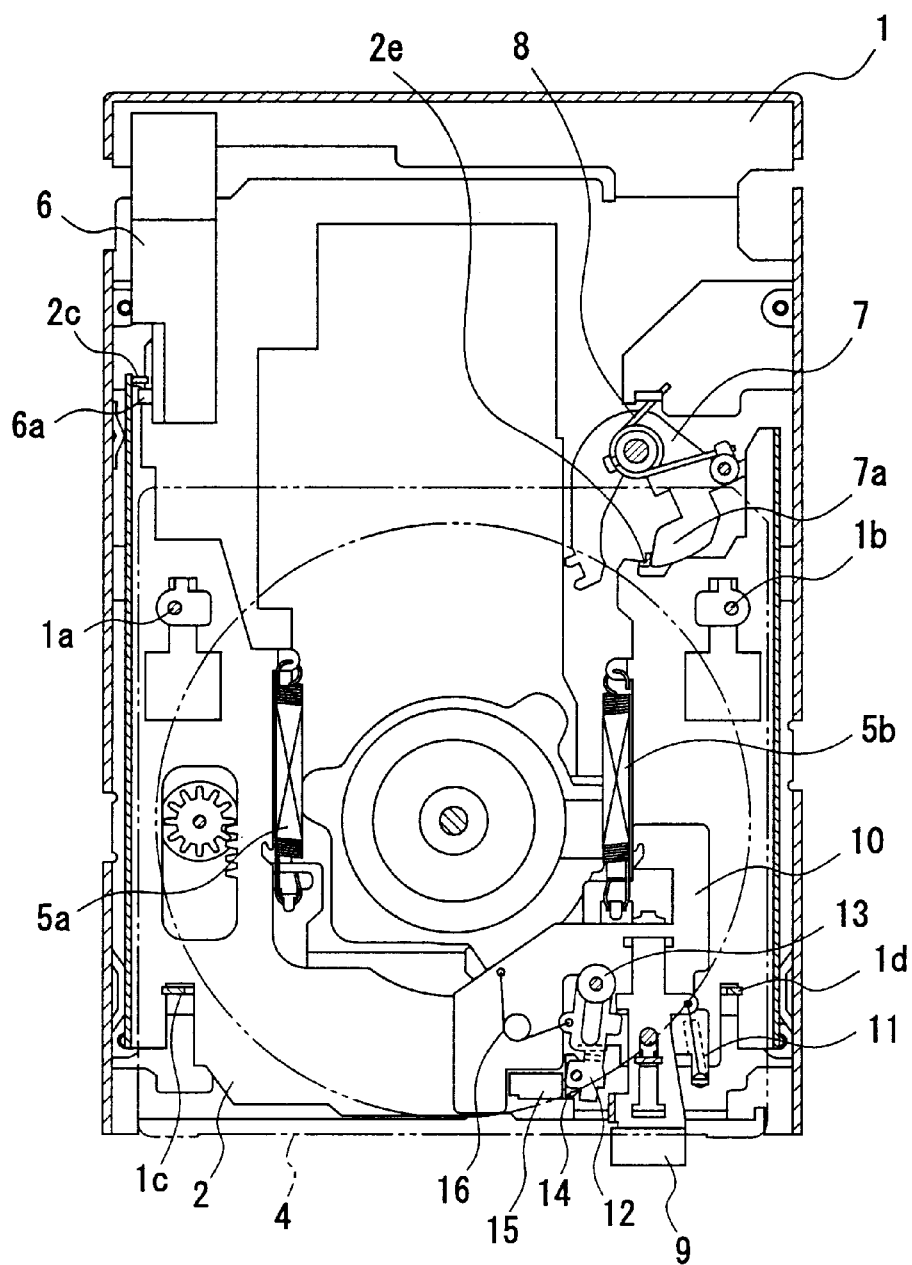
FIG. 1 is a schematic sectional view of an information recording and reproduction apparatus according to an embodiment of the present invention.
Figure 2:
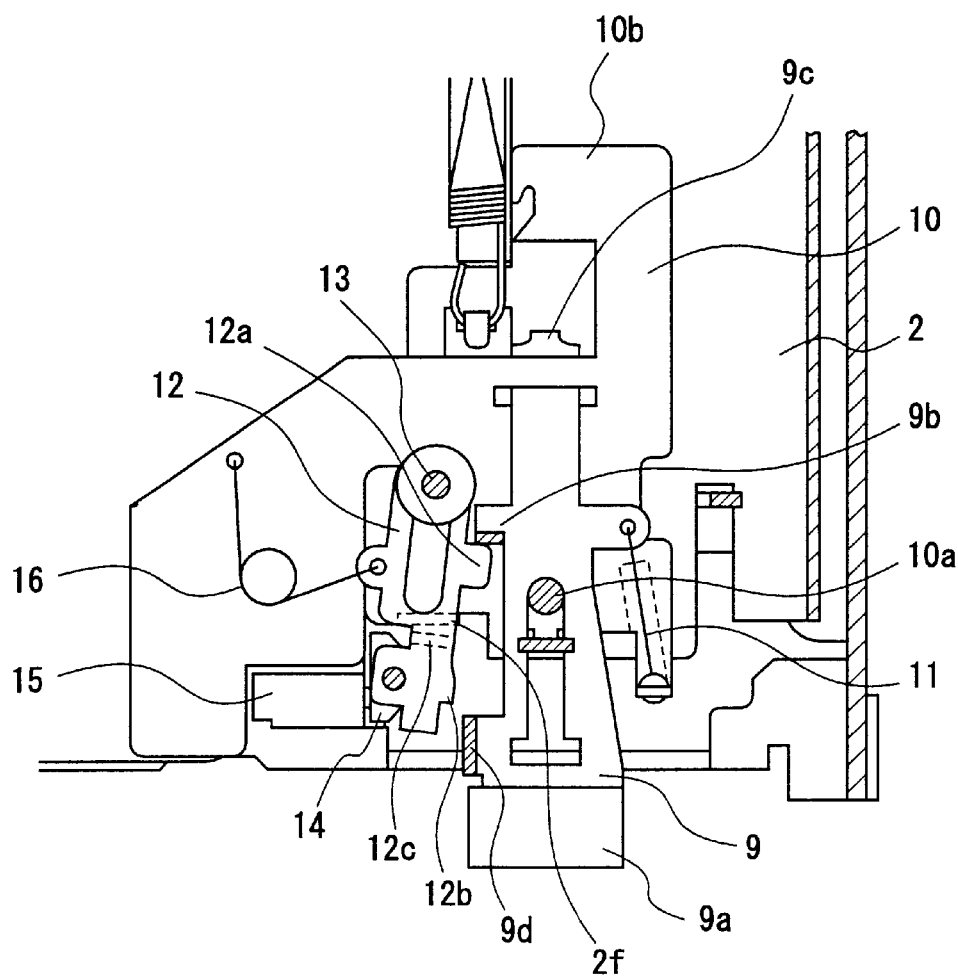
FIG. 2 is a schematic expanded section view of an exhaustion preventing means of the recording medium according to the embodiment of the present invention.
Figure 3:
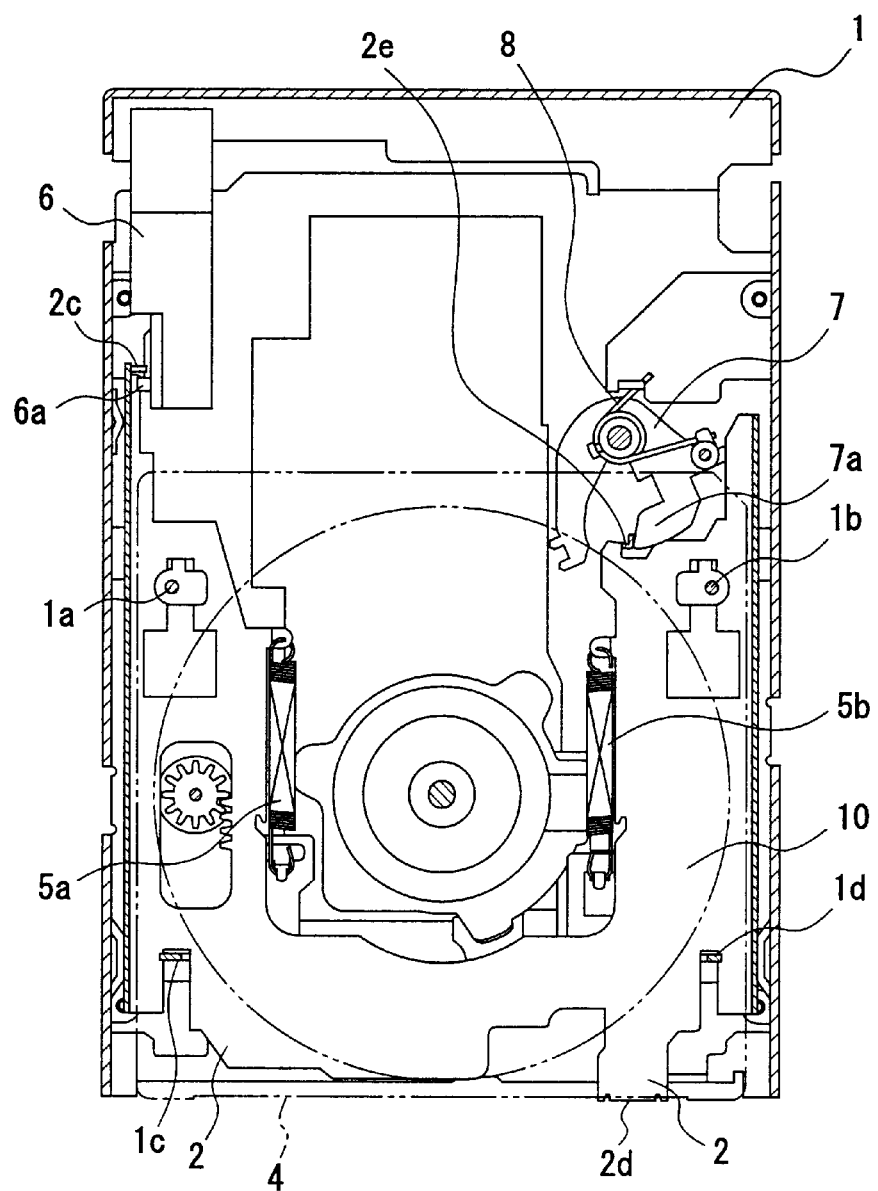
FIG. 3 is a schematic sectional view of a conventional information recording and reproduction apparatus.
Figure 4:
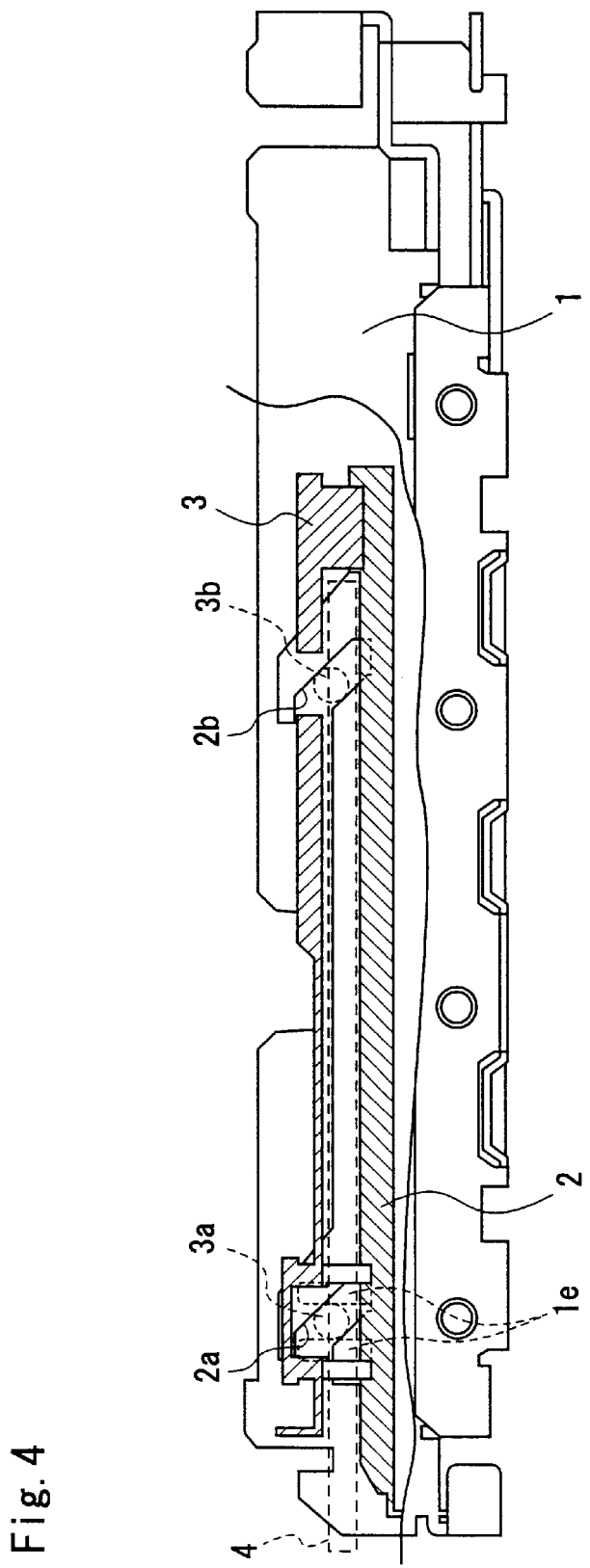
FIG. 4 is a schematic right sectional view of the conventional information recording and reproduction apparatus.
Figure 5A:
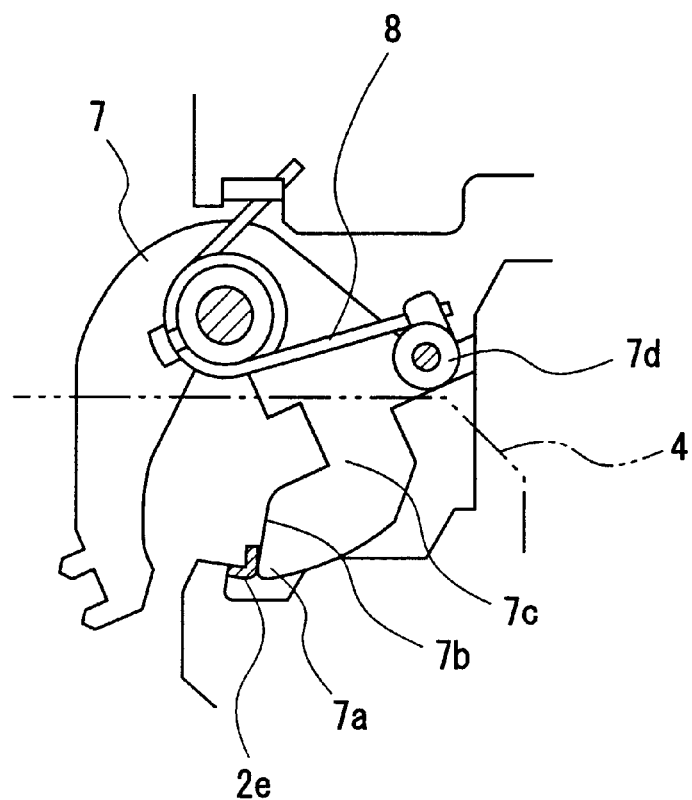
FIG. 5(a) is a schematic expanded section view of a loading mechanism showing the state before the recording medium is exhausted. Similarly.
Figure 5B:
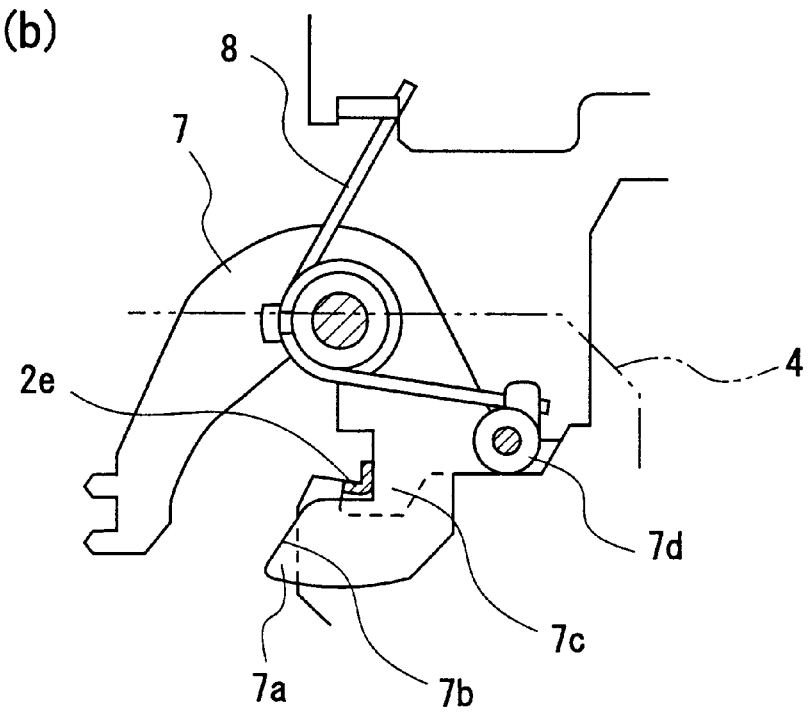
FIG. 5(b) is an expanded section view of the loading mechanism showing the state after the recording medium is exhausted similarly.

FIG. 1 is a top view illustrating the internal structure of the recording apparatus A, and FIG. 2 is an enlarged top view of the exhaustion preventing means B provided in the recording apparatus A. Further, in these figures, the same reference numerals as those in the above-mentioned recording apparatus X denote the same parts, and their explanations will be omitted.

A loading mechanism and a mechanical driving means for mechanically driving the loading mechanism which are provided in the recording apparatus A according to this embodiment are constituted with the same parts as those in the above-mentioned recording apparatus X and operate similarly. Further, the recording apparatus A is provided with the exhaustion preventing means B for preventing the loading mechanism from operating improperly, i.e., from being driven mechanically during when the recording apparatus A is recording information into the recording medium 4. Hereinafter, a description will be given of the exhaustion preventing means B.

An eject slider 9 is regulated for its movement in upward-to-downward direction and rightward-to-leftward direction by an eject base plate 10. Further, as shown in FIG. 2, the eject slider 9 is connected with the eject base plate 10 through the eject slider spring 11, and thus subjected to a force forward. Thereby the eject slider 9 usually projects forward to the position where it is collided with a stopper part 10a of the eject base plate 10, being at a front stopper position.

An eject lock lever 12 is regulated for its upward-to-downward movement by a lock lever screw 13, and usually rotates in a right turn direction with the lock lever screw 13 as a fulcrum and stops at the position where an adsorption yoke 14 mounted on the eject lock lever 12 is collided with an eject latch magnet 15, which is an electromagnet, since a convex part 12a of the eject lock lever 12 is always subjected to a force in a forward direction applied by a stopper part 9b of the eject slider 9.

Further, the eject base plate 10 and the eject lock lever 12 are connected with a lock lever spring 16 which applies a force as if to open its arms outwardly. While this lock lever spring 16 applies a force in a direction to rotate the eject lock lever 12 to the left, the force is set weaker than that of an eject slider spring 11 in order not to rotate the eject lock lever 12 in a left turn direction in a state where the eject slider 9 has been moved forward.

Subsequently, a description will be given of a method of exhausting the recording medium 4 from the recording apparatus A which is provided with the exhaustion preventing means B.

When the recording medium 4 is to be exhausted from the recording apparatus A mechanically, or when the recording medium 4 is to be exhausted forcibly employing a manual exhaustion tool for emergency or the like, a knob part 9a of the eject slider 9 is pushed with a hand or a tool. By pushing the eject slider 9 backward, the stopper part 9b is also moved backward. Thereby, the eject lock lever 12 is released from the stopper part 9b of the eject slider 9, and is rotated in a left turn direction with the lock lever screw 13 as a fulcrum by the lock lever spring 16 until it is collided with the eject slider 9.

An engaging part 9d of the eject slider 9 which is pushed backward engages with an engaging part 12b of the eject lock lever 12. By keeping pushing the engaging part 9d even after it engages with the engaging part 12b, a bending part 12c of the eject lock lever 12 engages with a bending part 2f of the eject plate 2, whereby the eject slider 9 and the eject plate 2 are connected each other. By pushing the eject slider 9 backward, the eject plate 2 is also moved backward, thereby exhausting the recording medium 4 mechanically.

A description will be given of the operation of the exhaustion preventing means B for preventing the loading mechanism from operating improperly while the recording apparatus A is recording information into the recording medium 4, in the recording apparatus A which exhausts the recording medium 4 as described above.

During when information is being recorded into the recording medium 4, the eject latch magnet 15 is energized, and absorbs the adsorption plate 14 by a magnetic force. At this time, by that the magnetic adsorption force is set stronger than a force of the lock lever spring 16, even when the eject slider 9 is pushed backward, the eject lock lever 12 shall not rotate in a left turn direction. Consequently, the engaging part 9d of the eject slider 9 does not engages with the engaging part 12b of the eject lock lever 12, and even when the eject slider 9 is pushed backward during the recording, the eject plate 2 is not pushed backward, with only the top part 9c of the eject slider 9 sliding to the position where it is collided with a stopper part 10b of the eject base plate 10 as a rear stopper, thereby preventing the recording medium 4 from being exhausted to the outside of the apparatus.

As described above, in the recording apparatus A according to this embodiment, during when an information is being recorded into the recording medium 4, though a part which is operated from the outside of the recording apparatus A operates, a loading mechanism is prevented from being driven mechanically by the operation of the exhaustion preventing means B to prevent a driving force from being transmitted to the mechanical driving means as described above, thereby preventing the recording medium 4 from being exhausted. Therefore, even when the recording apparatus A is forcibly operated from the outside in order to exhaust the recording medium 4, the exhaustion of the recording medium 4 by the operation from the outside of the recording apparatus A can be prevented without occurring deformation or destruction of the structural parts inside the recording apparatus A.

APPLICABILITY IN INDUSTRY

As described above, the information recording and reproduction apparatus according to the present invention is the one which records the information signal into the information-recording medium such as a magnetic disk, an optical disk, and a magnet-optical disk as well as reproduces the information signal recorded in such recording medium. This is available as the information recording and reproduction apparatus which can prevent the exhaustion of the recording medium during the recording of information signal into the recording medium even when the information recording and reproduction apparatus is forcibly operated from the outside in order to exhaust the recording medium as well as prevent the structural parts inside the recording apparatus from being deformed or destroyed.

What is claimed is:

1. An information recording and reproduction apparatus which performs recording of information into a recording medium or reproduction of the information recorded in the recording medium, where the recording medium can be inserted/ejected, comprising at least;

loading mechanism for exhausting the recording medium to the outside of the information recording and reproduction apparatus;

operated moving part which is moved by the operation from the outside of the information recording and reproduction apparatus;

mechanical driving means for mechanically driving the loading mechanism; and exhaustion preventing means for preventing the loading mechanism from being driven mechanically during when the information recording and reproduction apparatus is recording the information into the recording medium, wherein a driving force of the mechanical driving means is associated with a driving force of the being subjected to operation and moving part, and the exhaustion preventing means is operated when the association is cut off.

* * * * *